United States Patent
Prevel

(10) Patent No.: US 10,254,638 B2
(45) Date of Patent: Apr. 9, 2019

(54) ROLL-UP VIDEO-PROJECTION SCREEN WITH A CURVED FABRIC

(71) Applicant: Arnaud Prevel, Seclin (FR)

(72) Inventor: Arnaud Prevel, Seclin (FR)

(73) Assignee: Arnaud Prevel (FR)

( * ) Notice: Subject to any disclaimer, the term of this patent is extended or adjusted under 35 U.S.C. 154(b) by 0 days.

(21) Appl. No.: 16/045,797

(22) Filed: Jul. 26, 2018

(65) Prior Publication Data

US 2019/0033701 A1 Jan. 31, 2019

(51) Int. Cl.
G03B 21/58 (2014.01)

(52) U.S. Cl.
CPC .................................. G03B 21/58 (2013.01)

(58) Field of Classification Search
CPC .................................................. G03B 21/58
USPC ................................... 359/461, 451; 160/238
See application file for complete search history.

(56) References Cited

U.S. PATENT DOCUMENTS

| 774,641 A * | 11/1904 | Barkhurst | B60J 1/2011 |
| | | | 160/108 |
| 2,868,285 A * | 1/1959 | Pidgeon | G03B 21/58 |
| | | | 160/294 |
| 3,092,174 A * | 6/1963 | Winn | B60J 1/205 |
| | | | 160/262 |
| 7,337,567 B2 * | 3/2008 | Fritsche | G09F 11/21 |
| | | | 40/514 |
| 2005/0161174 A1 | 7/2005 | Kirby | |

FOREIGN PATENT DOCUMENTS

| DE | 296 15 437 | 1/1997 |
| JP | 2014-35512 | 2/2014 |
| WO | 2006/060399 | 6/2006 |

OTHER PUBLICATIONS

French Search Report dated Mar. 29, 2016.

\* cited by examiner

*Primary Examiner* — Christopher E Mahoney
(74) *Attorney, Agent, or Firm* — Gerald E. Hespos; Michael J. Porco; Matthew T. Hespos

(57) ABSTRACT

A roll-up video-projection screen (1) has a transverse upper casing (2) enclosing a horizontal rotating drum (11) around which rolls up and unrolls a projection fabric (10) provided at the bottom part with a weighting and tensioning element (30). The projection fabric (12) has a front projection face (12). The screen (1) includes a mechanical assembly (20) imposing, when the fabric (10) is unrolled, a transverse curvature to the front projection face (12). The imposed curvature of the front face (12) of the fabric (10) also exists in the unrolled position of use of the screen (1).

12 Claims, 2 Drawing Sheets

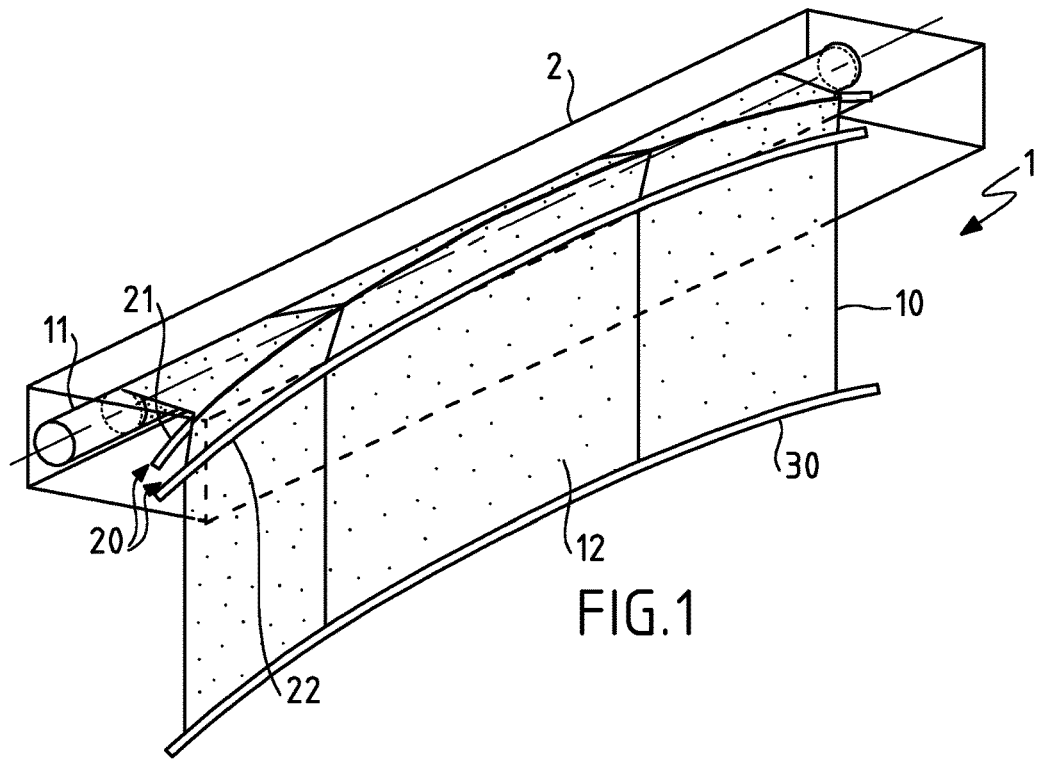
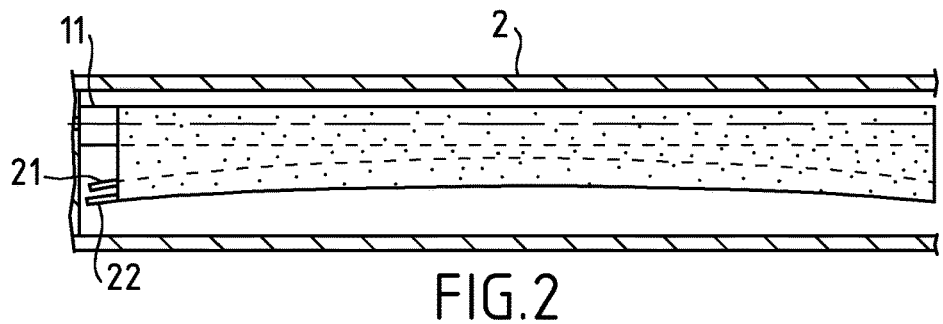
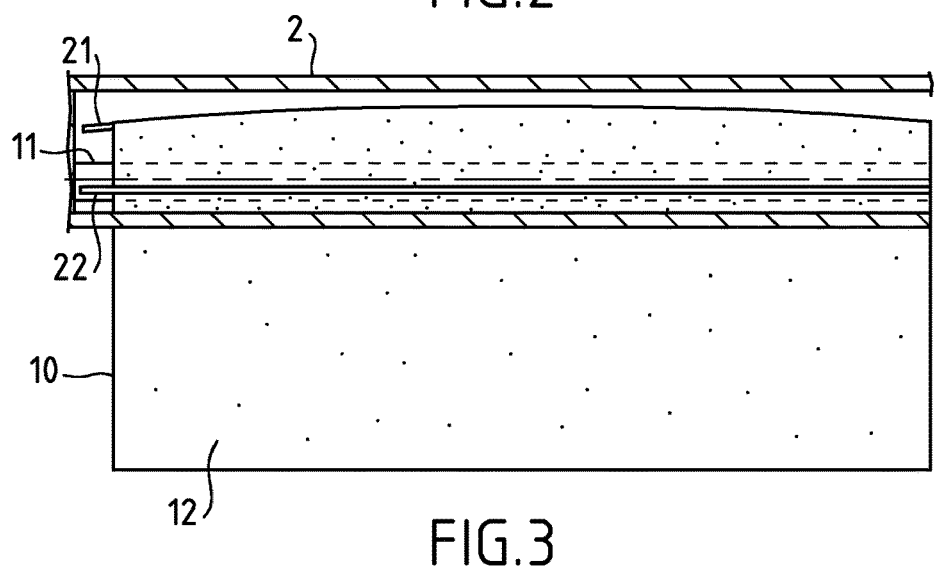

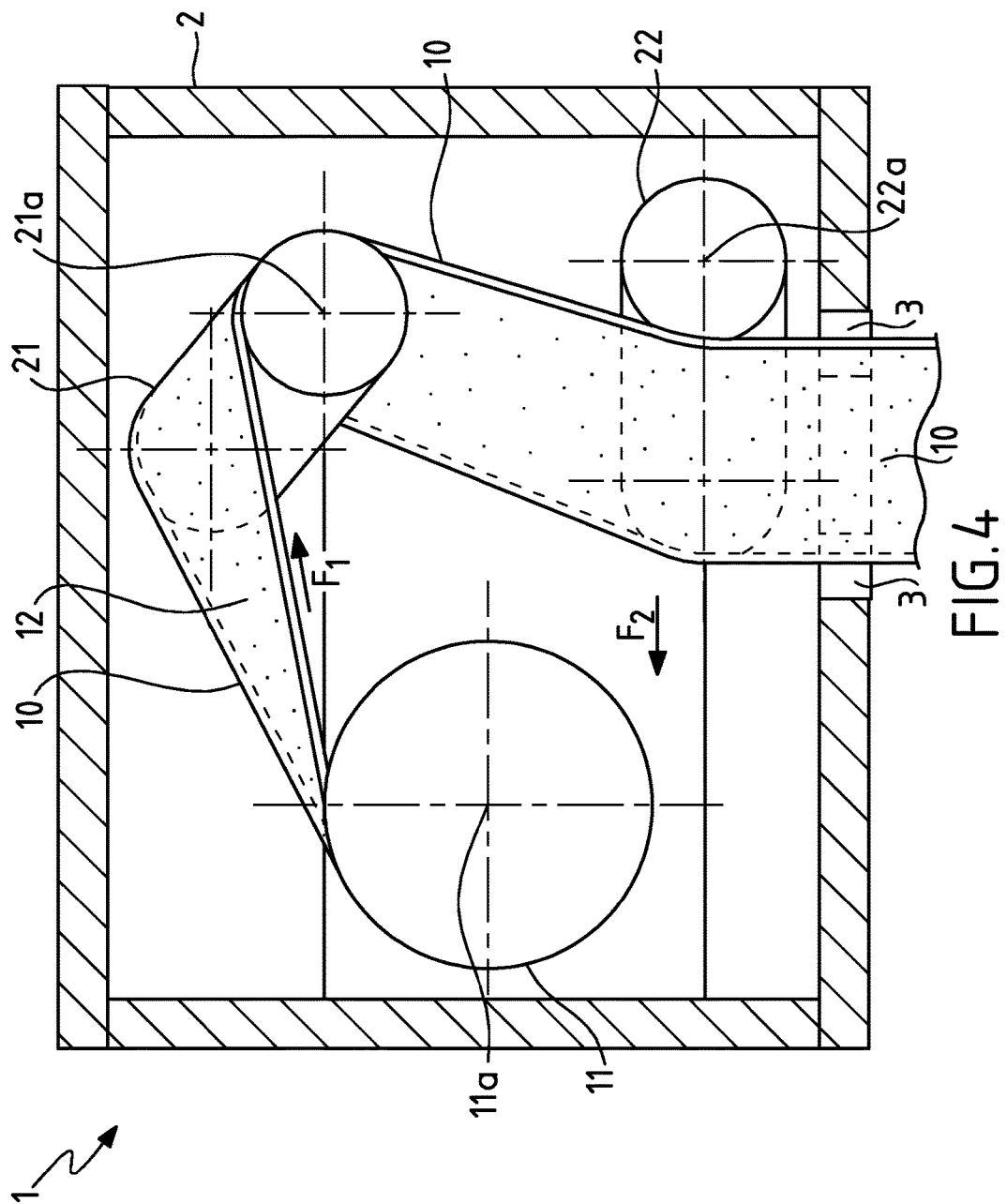

ROLL-UP VIDEO-PROJECTION SCREEN WITH A CURVED FABRIC

BACKGROUND

Field of the Invention

The invention relates to a roll-up video-projection screen.

Related Art

Many types of video-projection screens exist in the prior art, whether for use in a cinema or at home, or even as a portable solution. These screens are divided overall into two categories, fabrics mounted/stretched on a fixed frame, such as those in cinemas or some personal private screening rooms, and roll-up screens that are more often used at home hanging on a panel (ceiling or wall) in static or portable mode and connected to a foldable supporting stand.

Although static type screens can be curved, they are often very large. By contrast, roll-up screens are totally flat and are not optimized for human vision.

One aim of the invention, therefore, is to solve the above problems by implementing a simple, reliable and efficient solution.

SUMMARY

The invention relates to a roll-up video-projection screen comprising a transverse upper casing enclosing a horizontal rotating drum around which rolls up and unrolls a projection fabric of standard type provided at the bottom part with a weighting and tensioning element and comprising a front projection face. The projection screen also comprises an assembly of mechanical means imposing, when the fabric is unrolled, a transverse curvature to the front projection face. The imposed curvature of the front face of the fabric also exists in the unrolled position of use of the screen.

According to one embodiment of the invention, the curvature is constant whatever the unrolled position of the fabric.

The curving means comprise two transverse profiles arranged in an upper casing, one upstream profile, located behind the front projection face of the fabric, and one downstream profile located in front of the front projection face of the fabric, so that the curvature is imposed on the fabric that is trapped between these two transverse profiles.

In one embodiment, the upstream transverse profile is closer to the rotating drum than the downstream transverse profile. In another embodiment, the downstream transverse profile is closer to the rotating drum than the upstream transverse profile.

In one embodiment, the curving transverse profiles are curved backwards and arranged in relation to one another so that each point of the fabric, whatever its longitudinal position along the downstream transverse profile, follows the same path of travel as the downstream profile on unrolling the fabric, so that two points of the screen that are situated on the same transverse line of the screen in the rolled-up position find themselves on the same horizontal line in the unrolled position of said screen.

The transverse weighting element may have a regular and symmetrical curvature that extends in a horizontal plane and that corresponds to the curvature of the fabric assembly in the unrolled position of use of the screen, and the projection on a horizontal plane of the downstream transverse profile has an identical curvature to that of the transverse weighting element.

In one embodiment, the radius of curvature of the downstream profile, projected on a horizontal plane, is around 10 m for a 2 m-wide screen.

The upstream transverse profile may extend in an inclined plane in relation to the plane in which the downstream transverse profile extends, preferably at an angle of around 45°±5°.

The transverse profiles may be tubes with a round or oval section.

The invention will now be described in further detail with reference to specific embodiments given solely by way of illustration and represented in the accompanying Figures.

BRIEF DESCRIPTION OF THE DRAWINGS

FIG. 1 is a perspective view of a roll-up video-projection screen according to the invention.
FIG. 2 is a top view of FIG. 1.
FIG. 3 is a front view of FIG. 1.
FIG. 4 is a side view of FIG. 1.

DETAILED DESCRIPTION

FIG. 1 represents a roll-up/unrollable video-projection screen 1 comprising a transverse upper casing 2 typically in the form of a rectangular-section parallelepiped box provided with a bottom opening 3. This casing 2, which can be hung at height from a wall or ceiling, encloses a roll-up/unrollable projection fabric 10 of known type, the curving means 20 and a weighting element 30.

More precisely, the projection fabric 10 is rolled onto a cylindrical rotating drum 11 extending horizontally across the casing 2. Preferably, the drum 11 is motorized but the projection fabric 10 can also be unrolled by hand by acting, for example, on the weighting element 30 by pulling the latter towards the ground.

The fabric 10 has a front projection face 12, for example white in color, provided with micro-perforations (not shown) adapted to allow the sound from loudspeakers, which can be placed behind said fabric 10 when the latter is unrolled, to pass through.

In the downstream (bottom) part of the screen 1 there is a weighting element 30 fixed to the bottom end of the fabric 10 and having the form of a curved bar |31|[A1] with a round, oval or square section and made for example of solid metal.

In the upstream (top) part of the screen 1, arranged inside the casing 2, there are mechanical curving means 20 having more particularly the form of a first upstream transverse profile 21 and a second downstream transverse profile 22.

More precisely, the upstream transverse profile 21 is located behind the projection fabric 10 and the downstream profile 22 is located in front of the front projection face 12 of said fabric 10, so that a constant curvature is imposed on the fabric 10 that is trapped between these two transverse profiles 21 and 22 during its entire unrolling and its descent towards the ground, as will be described later. In the present case, the curvature is of the concave type when the viewer is facing the screen. During this descent, the fabric passes through the opening 3 which can have an arched form having substantially the same curvature as that of the weighting element 30, or a rectangular section.

As can be seen in FIG. 4, the upstream transverse profile 21, and more precisely its longitudinal main axis 21a, is located slightly higher than the axis of rotation 11*a* of the rotating drum 11, whereas the downstream transverse profile 22, and more precisely its longitudinal axis 22*a*, is located slightly lower than the axis of rotation 11*a* of said rotating drum 11.

Similarly, the upstream transverse profile 21 is arranged closer to the drum 11 than the downstream transverse profile 22.

As shown in FIG. 3, both profiles 21 and 22 are curved backwards in a regular way each along a substantially constant, but different, radius of curvature, towards the drum 11 and therefore the back of the projection fabric 10. In the present case, the curvature, arranged in a horizontal plane, of the upstream transverse profile 21 is greater than that of the downstream transverse profile 22. In other words, the radius of curvature of the upstream transverse profile 21 is smaller than that of the downstream transverse profile 22. Typically, the radius of curvature of the upstream transverse profile 21 can be around 10 m for a 2-meter wide projection fabric 10, while the radius of curvature of the downstream transverse profile 22 will be around 11 m.

As can be seen in FIG. 3, the downstream transverse profile 22 extends only in a horizontal plane whereas the curvature of the upstream transverse profile 21 also extends up (see FIG. 4) in an inclined plane in relation to the plane in which the downstream transverse profile 22 extends. For example, the upstream transverse profile 21 extends backwards and upwards in a plane inclined at around 45°±5° in relation to the horizontal plane in which the downstream transverse profile 22 extends.

The operation of this screen 1 is as follows:

As the projection fabric 10 unrolls from the rotating drum 11 and descends towards the ground through the slot 3 in the casing 2, this fabric, being trapped between the upstream 21 and downstream 22 profiles, more specifically between the front of the upstream transverse profile 21 and the back of the downstream transverse profile 22, said fabric 10 assumes the form imposed upon it by these mechanical curving means 20 so that it remains curved for its entire descent, said curvature being preserved once the fabric 10 has fully descended.

As the transverse weighting element 30 has a regular and symmetrical curvature that extends in a horizontal plane and that corresponds to the curvature of the upstream transverse profile 22, the curvature of the projection fabric assembly 10 in its unrolled position of use is also the same as that of the downstream transverse profile 22 and of the weighting element 30.

More precisely, the curvature of the projection fabric 10, when the latter is unrolled, is equal to the projection of the radius of curvature of the downstream transverse profile 22 on a horizontal plane.

The weighting element 30, also is curved, and allows the fabric 10 to be stretched down due to the effect of its own weight while contributing to the preservation of the curve.

Due to the geometric configuration of the different elements in relation to one another, the upstream transverse profile 21 tends to push the fabric 10 towards the front (and slightly towards the top) of the screen 1 (arrow F1) so as to distance it from the rotating drum 11, while the downstream transverse profile 22 has a tendency to pull said fabric 10 so as to bring it backwards (arrow F2) towards the rotating drum 11, which creates a tension in said projection fabric 10.

As the projection fabric 10 unrolls, each point of said fabric, whatever its longitudinal position along the downstream transverse profile 22, follows the same path of travel as said downstream profile 22 as the fabric unrolls. Thus, two points of the fabric that are situated on the same transverse line of the screen in the rolled up position thereof find themselves on the same horizontal line in the unrolled position of said screen. This guarantees that the fabric not only stays curved but also taut, with no fold or fault that could impair the projection.

Thus, the screen 1 of the present invention comprises a projection fabric 10 that can be both unrolled/rolled up round a cylindrical rotating drum 11 and has a constant curvature for its entire height once said fabric 10 is totally unrolled, which did not previously exist. This curvature of the projection fabric 10 induced by the form and respective position of the transverse profiles 21 and 22 improves the visual comfort of viewing a film projected onto said fabric, and the screen 1 remains, if necessary, portable (if the casing is mounted on a tripod).

When the projection fabric 10 is rolled up, its curvature disappears between the upstream transverse profile 21 and the drum so that it can roll up, again without any fold, onto the cylinder of said drum.

Clearly, the detailed description of the subject-matter of the invention, given purely by way of illustration, is in no way limiting, equivalent techniques being also included in the scope of the present invention.

Thus, the upstream profile can be located in front of the projection face of the fabric and the downstream profile can be located behind said projection face of the fabric, so that the curvature is imposed on the fabric that is trapped between these two transverse profiles.

This type of screen is adapted to other applications than those described, for example roll-up advertising screens.

Of course, the curvature of the fabric of the screen can be convex (when the viewer is facing the screen) by inverting the curvature of the two transverse profiles that are thus curved forwards, the downstream profile remaining located in front of the front face of the fabric while the upstream profile is located behind said fabric.

What is claimed is:

1. A roll-up video-projection screen (1) comprising a transverse upper casing (2) enclosing a horizontal rotating drum (11) around which rolls up and unrolls a projection fabric (10) provided at a bottom part with a weighting and tensioning element (30), the projection fabric having a front projection face (12), the roll-up video-projection screen further having an assembly of mechanical curving means (20) imposing, when the fabric (10) is unrolled, a transverse curvature to the front projection face (12), said imposed curvature of the front face (12) of the fabric (10) also existing in the unrolled position of use of the screen (1), wherein the curving means (20) comprise two transverse curvature profiles (21, 22) arranged in an upper casing (2), the two transverse curvature profiles (21, 22) including one upstream profile (21) located behind the front projection face (12) of the fabric (10) and one downstream profile (22) located in front of said front projection face (12) of the fabric (10), so that the curvature is imposed on the fabric (10) that is trapped between these two transverse curvature profiles (21, 22) and in that the transverse curvature profiles (21, 22) are curved backwards and arranged in relation to one another so that each point of the fabric (10), whatever its position along the downstream transverse profile (22), follows the same path of travel as the downstream profile (20) on unrolling the fabric (10), so that two points of the screen that are situated on the same transverse line of the screen in the rolled-up position thereof are on the same horizontal line in the unrolled position of said screen, wherein an axis of the upstream transverse profile (21) is located higher than a rotational axis of the rotating drum (11) and an axis of the downstream transverse profile is located lower than the rotational axis of the rotating drum (11).

2. The screen (1) of claim 1, wherein curvature is constant whatever the unrolled position of the fabric (10).

3. The screen (1) of claim 1, wherein:
the transverse weighting element (30) has a regular and symmetrical curvature that extends in a horizontal plane and that corresponds to the curvature of the fabric assembly in the unrolled position of use of the screen, and
a projection on a horizontal plane of the downstream transverse profile (22) has an identical curvature to that of the transverse weighting element (30).

4. The screen (1) of claim 1, wherein a radius of curvature of the downstream profile, projected on a horizontal plane, is approximately 10 m for a 2 m-wide screen.

5. The screen (1) of claim 1, wherein the upstream transverse profile (21) extends in a plane inclined at an angle of 45°±5° in relation to a plane in which the downstream transverse profile (22) extends.

6. The screen (1) of claim 1, wherein the transverse profiles (21, 22) are tubes with a round or oval section.

7. A roll-up video-projection screen (1), comprising a transverse upper casing (2) enclosing a horizontal rotating drum (11) round which rolls up and unrolls a projection fabric (10) provided at the bottom part with a weighting and tensioning element (30), the projection fabric having a front projection face (12), the roll-up video-projection screen further having an assembly of mechanical curving means (20) imposing, when the fabric (10) is unrolled, a transverse curvature to the front projection face (12), said imposed curvature of the front face (12) of the fabric (10) also existing in the unrolled position of use of the screen (1), wherein the curving means (20) comprise two transverse curvature profiles (21, 22) arranged in an upper casing (2), the two transverse curvature profiles (21, 22) including one upstream profile (21) located behind the front projection face (12) of the fabric (10) and one downstream profile (22) located in front of said front projection face (12) of the fabric (10), so that the curvature is imposed on the fabric (10) that is trapped between these two transverse curvature profiles (21, 22) and in that the transverse curvature profiles (21, 22) are curved backwards and arranged in relation to one another so that each point of the fabric (10), whatever its position along the downstream transverse profile (22), follows the same path of travel as the downstream profile (20) on unrolling the fabric (10), so that two points of the screen that are situated on the same transverse line of the screen in the rolled-up position thereof are on the same horizontal line in the unrolled position of said screen, wherein at least part of the downstream transverse profile (22) is closer to the rotating drum (11) than the upstream transverse profile (21).

8. The screen (1) of claim 7, wherein:
the transverse weighting element (30) has a regular and symmetrical curvature that extends in a horizontal plane and that corresponds to the curvature of the fabric assembly in the unrolled position of use of the screen, and
a projection on a horizontal plane of the downstream transverse profile (22) has an identical curvature to that of the transverse weighting element (30).

9. The screen (1) of claim 7, wherein a radius of curvature of the downstream profile, projected on a horizontal plane, is approximately 10 m for a 2 m-wide screen.

10. The screen (1) of claim 7, wherein the upstream transverse profile (21) extends in a plane inclined at an angle of 45°±5° in relation to a plane in which the downstream transverse profile (22) extends.

11. The screen (1) of claim 7, wherein the transverse profiles (21, 22) are tubes with a round or oval section.

12. The screen (1) of claim 7, wherein curvature is constant whatever the unrolled position of the fabric (10).

* * * * *